(12) United States Patent
Sletmoe et al.

(10) Patent No.: US 10,298,968 B2
(45) Date of Patent: May 21, 2019

(54) DISTRIBUTED MULTI-DATACENTER VIDEO PACKAGING SYSTEM

(71) Applicant: Amazon Technologies, Inc., Seattle, WA (US)

(72) Inventors: Kyle Sletmoe, Portland, OR (US); Kristopher Kosmatka, Portland, OR (US); William Shogren, Beaverton, OR (US); Rory McCarthy, Portland, OR (US); Saurav Sengupta, Beaverton, OR (US); Gary Hertel, Beaverton, OR (US); Michael Kale, Portland, OR (US); Ramya Krishnamoorthy, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/841,119

(22) Filed: Dec. 13, 2017

(65) Prior Publication Data

US 2019/0082197 A1 Mar. 14, 2019

Related U.S. Application Data

(60) Provisional application No. 62/558,265, filed on Sep. 13, 2017.

(51) Int. Cl.
*H04N 21/2343* (2011.01)
*H04N 21/239* (2011.01)
*H04N 21/24* (2011.01)
*H04N 21/643* (2011.01)

(52) U.S. Cl.
CPC ..... *H04N 21/2343* (2013.01); *H04N 21/2393* (2013.01); *H04N 21/2402* (2013.01); *H04N 21/643* (2013.01)

(58) Field of Classification Search
CPC .......... H04N 21/2343; H04N 21/2393; H04N 21/2402; H04N 21/643
See application file for complete search history.

(56) References Cited

U.S. PATENT DOCUMENTS

| | | | |
|---|---|---|---|
| 9,124,671 B2 | 9/2015 | Roth | |
| 9,426,543 B1 | 8/2016 | Li | |
| 9,532,092 B1* | 12/2016 | Suryanarayanan | .......................... H04N 21/2662 |
| 2005/0235047 A1* | 10/2005 | Li | ..................... H04L 29/06027 709/219 |
| 2010/0146139 A1 | 6/2010 | Brockmann | |
| 2010/0169977 A1 | 7/2010 | Dasher | |
| 2010/0235528 A1 | 9/2010 | Bocharov | |
| 2011/0083037 A1* | 4/2011 | Bocharov | ........ H04N 21/23116 714/4.11 |

(Continued)

*Primary Examiner* — Randy A Flynn
(74) *Attorney, Agent, or Firm* — Knobbe, Martens, Olson & Bear, LLP

(57) ABSTRACT

A content streaming system and methodology for facilitating the management of content streaming. A video packaging and origination service receives streaming content that is organized according to content segments. Individual content segments will be encoded according to a plurality of encoding profiles and received at different ingress nodes within video packaging and origination service. The video packaging and origination service receives requests for streaming content from requesting entities. Sets of encoded content segments are transmitted by egress nodes.

20 Claims, 12 Drawing Sheets

(56) References Cited

U.S. PATENT DOCUMENTS

| | | |
|---|---|---|
| 2011/0274179 A1* | 11/2011 | Holden ............ H04N 21/23109 |
| | | 375/240.25 |
| 2012/0215779 A1 | 8/2012 | Lipstone |
| 2013/0067036 A1* | 3/2013 | Nooney ........... H04N 21/23439 |
| | | 709/219 |
| 2013/0128947 A1 | 5/2013 | Fryer |
| 2013/0142499 A1* | 6/2013 | Major .............. H04N 21/23103 |
| | | 386/341 |
| 2013/0177294 A1 | 7/2013 | Kennberg |
| 2013/0198328 A1 | 8/2013 | Green |
| 2013/0227074 A1 | 8/2013 | Odlund |
| 2013/0322466 A1 | 12/2013 | Ucar |
| 2013/0332971 A1 | 12/2013 | Fisher |
| 2015/0304306 A1 | 10/2015 | Ponsford |
| 2015/0324379 A1 | 11/2015 | Danovitz |
| 2015/0381755 A1 | 12/2015 | Li |
| 2017/0272792 A1 | 9/2017 | Bachmutsky |
| 2018/0139260 A1 | 5/2018 | Houle |

* cited by examiner

DISTRIBUTED MULTI-DATACENTER VIDEO PACKAGING SYSTEM

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers also provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
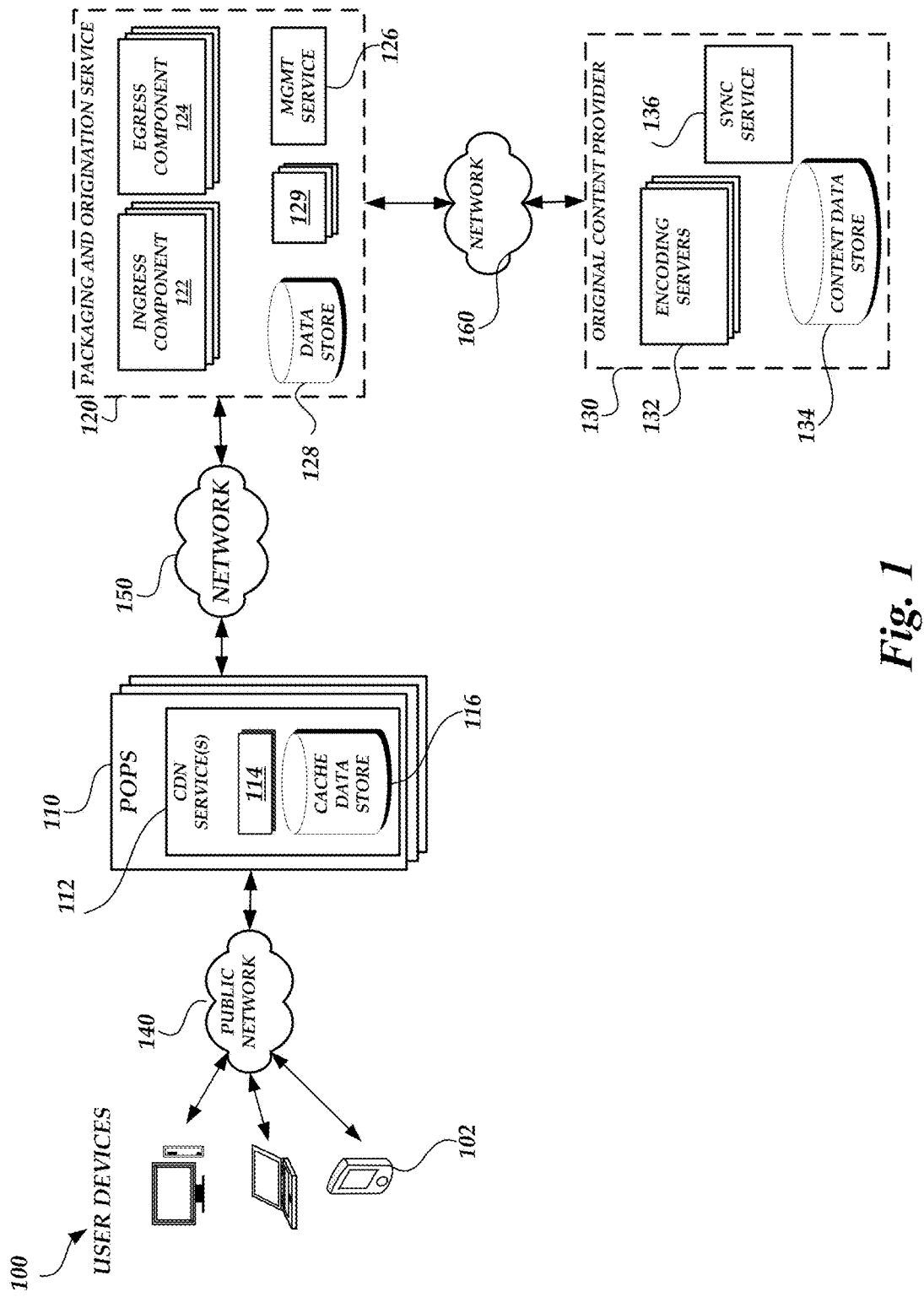
FIG. 1 is a block diagram of a content delivery environment that includes one or more user devices, a video packaging and origination service and an original content provider according to one embodiment.

Generally described, content providers can provide content to requesting users. With regard to video content, a content provider can implement a video packaging and origination service that is able to deliver video content to requesting users. Illustratively, a video packaging and origination service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

To deliver content, content providers can organize requested content, such as a video file, into multiple segments that are then transmitted to requesting devices, segment by segment. For example, in a video stream, each segment typically accounts for 2-10 seconds of video rendered on a receiving device. To provide content to the video packaging and origination service, individual content segments can be encoded by an encoder and transmitted to the video and origination service. Traditionally, a single processing node on the video packaging and origination service can receive an incoming stream of encoded segments and then transmit the stream to requesting user devices.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

Traditionally, video packaging and origination services can maintain a single node or server to receive incoming content streams and transmit received streaming content to requesting clients. More specifically, the single node can operate as an ingress node to receive individual content streams or channels corresponding to encoded segments encoded to a specific encoding profile (e.g., encoding bitrate and format). The individual content streams or channels are provided by an original content provider. The single node can utilize state information that facilitates determination that all encoding versions of the same encoded segment have been received. However, the throughput of incoming data streams is limited by characteristics of the single node functionality. For example, an ingress node may experience latencies associated with processing more complex encoded content. In such situation, a video packaging and origination service could experience additional inefficiencies by limiting the ability of the video packaging and origination service to process additional encoding channels related to other encoding profiles until the current encoded data is processed. Similarly, a single node may experience a failure, which will result in downstream unavailability of the content stream.

Additionally, the single node or server traditionally operates as an egress node to process requests for content by transmitting a content stream in the form of a set of encoded segments to a requesting entity, such as a CDN service or user devices. The single node can access the encoded content information received from the original content provider and generate content streams to requesting entities. In such traditional embodiments, the location of the single node (functioning as both an ingress and egress node) can be optimized for the attributes of the original content provider or the attributes of the requesting entity. For example, the single node may be instantiated in a geographic area logically proximate to the original content provider, which can lead to inefficiencies in the transmission of content streams for requesting entities. In another example, the single node may be instantiated in a geographic area logically proximate to one or more requesting entities, which can lead to inefficiencies in the transmission of content streams from the original content provider. In still another example, the computing resources for the single node are often optimized for an identified need of the ingress functionality or the egress functionality, which can lead to inefficiencies in the operation of the single node. For example, a single node may require a larger amount of processing and memory resources to receive and process incoming content streams than would be required to transmit content streams to requesting entities. Thus, scaling egress functionality would require server nodes with much higher computing resource requirements based on the dual function as an ingress node.

To address at least a portion of the inefficiencies described above with regard to single nodes functioning as ingress nodes and egress nodes, aspects of the present application corresponding to a multi-data center, multi-node system for receiving, processing and transmitting encoder streams. More specifically, aspects of the present application correspond to utilization of a set of nodes that function as ingress nodes and a set of nodes that function as egress nodes. The ingress nodes and egress nodes can correspond to separate computing devices or virtualized computing devices that can be configured individually to the relative function as ingress or egress nodes. The ingress and egress nodes can be individually instantiated and located based on the attributes of the original content provider and the video packaging and origination service for the ingress nodes and the attributes of the requesting entity and the video packaging and origination service for the egress nodes.

In accordance with other aspects of the present application, to facilitate interaction between different ingress and egress nodes, a video packaging and origination service can implement one or more services to manage the instantiated ingress nodes, the instantiated egress nodes and the interaction between ingress and egress nodes. Illustratively, an ingress node management service can monitor the operation of ingress nodes and facilitate the storage of processed encoding stream information, including redundant content stream ingestion. An egress management service can monitor the operation of egress nodes and facilitate access to the stored processed encoding stream information. In one embodiment, the ingress node management service and the egress management service, collectively a content management service, can utilize an index that identifies the stored location of individual encoded segments from a set of encoded segments corresponding to streaming content. The content management service can generate the index based on input from the ingress nodes that can identify the location and attributes on received encoded content segments. Additionally, the content management service can provide the index to all egress nodes information to allow for access to the encoded content segments at the time of responding to requests for streaming content. In this regarding, the egress nodes can dynamically generate content packages by collecting or compiling the stored, processed segments as identified in the index.

In still further aspects of the present application, the video packaging and origination service can further include a caching mechanism to facilitate the transmission of the streaming content. More specifically, individual geographic locations of sets of egress nodes may be associated with local caching resources to facilitate increased throughput or performance in responding to content requests. The local caching resources may be populated from the generated index. Additionally, management of the cached information can be optimized based on historical demand for content that has not yet been requested or to maintain encoded content in the cache beyond traditional cache management processes.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

Client computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each client computing device 102 may optionally include one or more data stores (not shown in FIG. 1) including various applications or computer-executable instructions, such as web browsers, used to implement the embodiments disclosed herein. Illustrative components of a client computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 110 can include one or more metric information processing component 114 for processing metric information provided by client computing devices 102 and a data store 116 for maintain collected metric information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and video packaging and origination service 110 are depicted as having a single connection to the network 140, individual components of the client computing devices 102 and video packaging and origination service 110 may be connected to the network 130 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 110 may utilize any number or combination of networks.

In accordance with embodiments, the video packaging and origination service 120 includes one or more servers for receiving content from original content providers 130 and processing the content to make available a set of received encoded bitrate segments. As described in further detail below, the video packaging and origination service 120 includes a plurality of ingress components 122 utilized to receive encoded data streams from encoding servers 132 from content providers 130. Illustratively, the ingress components 122 can generate deterministic data that will facilitate a determination of when a complete set of encoded content segments have been received and is ready for further processing or transmission. The video packaging and origination service 120 also includes one or more servers for receiving content requests for a requesting entity, such as a POP 110 or user device 102, accessing encoded content utilizing an index and transmission encoded content in return. The ingress components 122 and egress components 124 may be distributed according to geographic criteria or availability zones to facilitate delivery or access to encoded content.

The video packaging and origination service 120 can further include management services 126 for generating synchronization information utilized by the encoders, such as sequence numbers corresponding to the set of encoded segments, time stamp information related to a relative time of the encoded segments or from which relative time of encoded segments will be based, and the like. The management services 126 can control the generation or instantiation of additional ingress and egress components or the generation of the indices utilized to identify content. Still further, the video packing and origination service 120 can include a plurality of cache components 129 that maintain encoded content in one or more distinct availability zones, such as different geographic areas or zones. The video packaging and origination service 120 can further include a data store 128 for maintaining received encoded data for transmission.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one more virtual machines implemented in a hosted computing environment. A hosted computing environment may include one or more rapidly provisioned and released computing resources, which computing resources may include computing, networking or storage devices. Still further, aspects of the present application relate to the selection of individual ingress servers 122, egress servers 124 and local cache components 129 based on attributes of the components, such as geographic information, logical network information, and the like. Accordingly, while such components are illustrated as logically being logically grouped in FIG. 1, one skilled in the relevant art will appreciate that one or more aspects of the present application can include the video packaging and origination service 120 as being implemented in multiple geographic areas. Additionally, not all geographic areas hosting portions of the video packaging and origination service 120 will necessary have all the same components or combination of components.

With continued reference to FIG. 1, the content delivery environment 100 also includes original content providers 130. Illustratively, the original content provider can include a plurality of encoders 132 for generating multiple encoded streams for transmission to the video packaging and origination service 120. In one embodiment, individual encoders may generate different encode versions of a content segment according to a different encoding profile. The original content provider 130 can also include logic or other management components for determining how many encoders 132 should be utilized or how to manage the addition or removal of encoders. In some embodiments, the original content provider the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like. The video packaging and origination service 120 can further include a data store 134 for maintaining encoded data for transmission. The synchronization services 124 and 136 may work in conjunction or in a complimentary basis.

Figure 2:
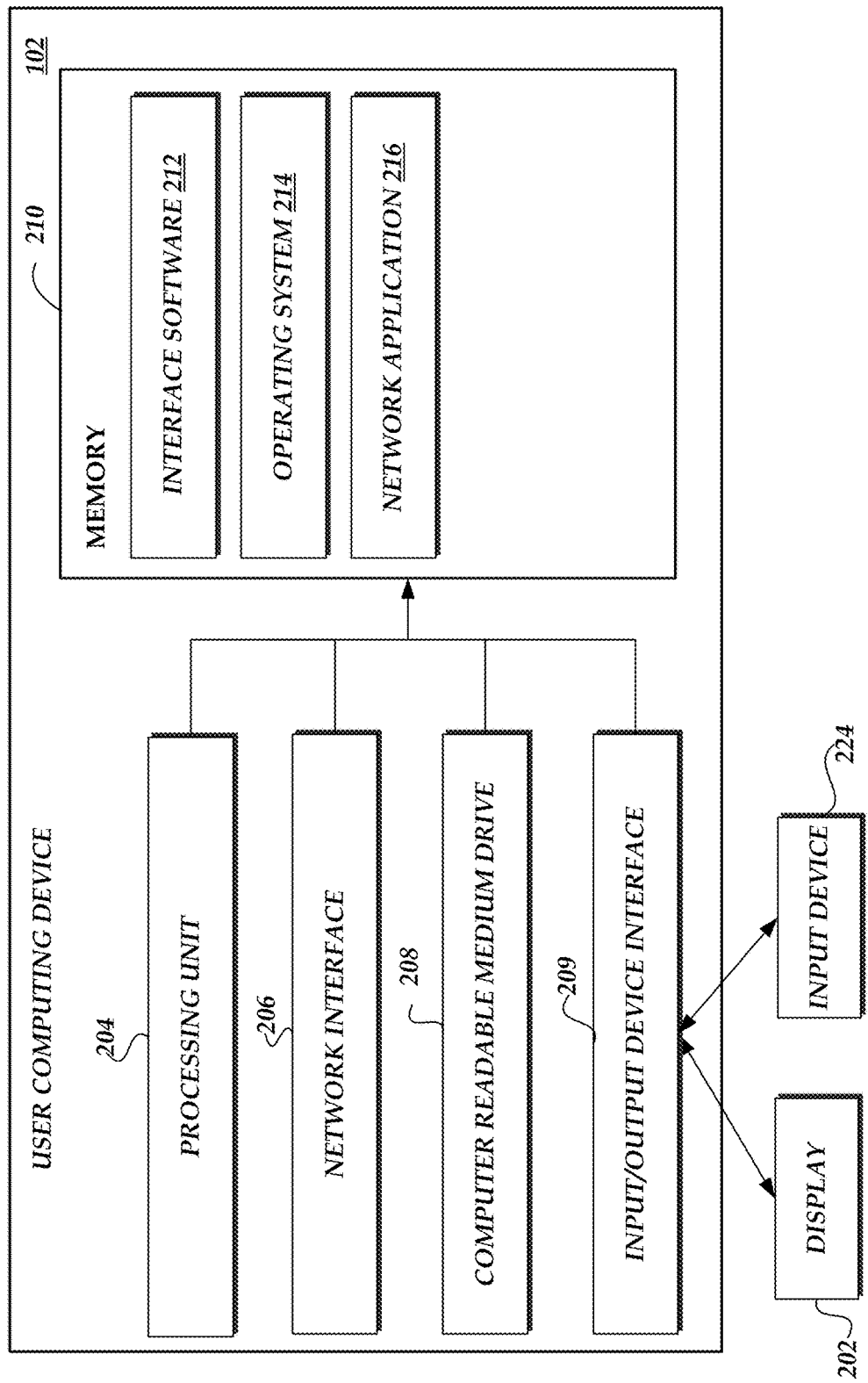
FIG. 2 is a block diagram of illustrative components of a user computing device configured to remotely process content in accordance with an illustrative embodiment.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the video packaging and origination service 120 or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with the video packaging and origination service 120.

Figure 3:
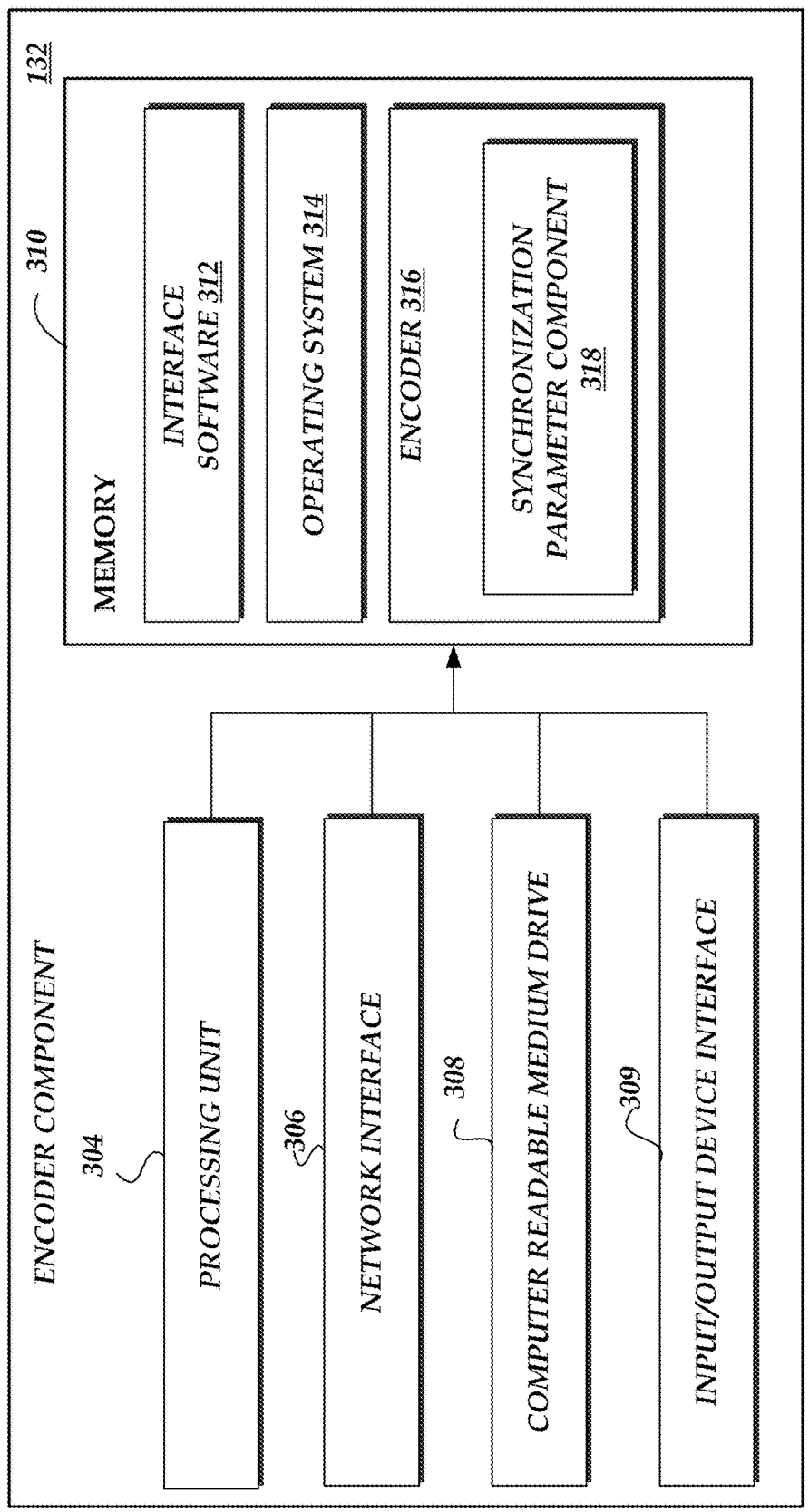
FIG. 3 is a block diagram of illustrative components of an encoder component configured to generate encoded content according to synchronization information in accordance with an illustrative embodiment.

FIG. 3 depicts one embodiment of an architecture of an illustrative server for encoding content as described herein. The general architecture of the encoder 132 depicted in FIG. 3 includes an arrangement of computer hardware and software components that may be used to implement aspects of the present disclosure. As illustrated, the encoder 132 includes a processing unit 304, a network interface 306, a computer readable medium drive 308, an input/output device interface 309, all of which may communicate with one another by way of a communication bus. The components of the encoder 132 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoder 132 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from the video packaging and origination services 120.

Additionally, the memory 310 includes an encoder component 316 for processing content segments. Additionally, the encoder component 316 can further include a synchronization parameter component 318 for utilizing the synchronization information in the encoding process to increase the likelihood that encoded segments from multiple encoders can be utilized by a video packaging and origination service 120. The synchronization information can be utilized in the generation of deterministic data as will be described below.

Figure 4:
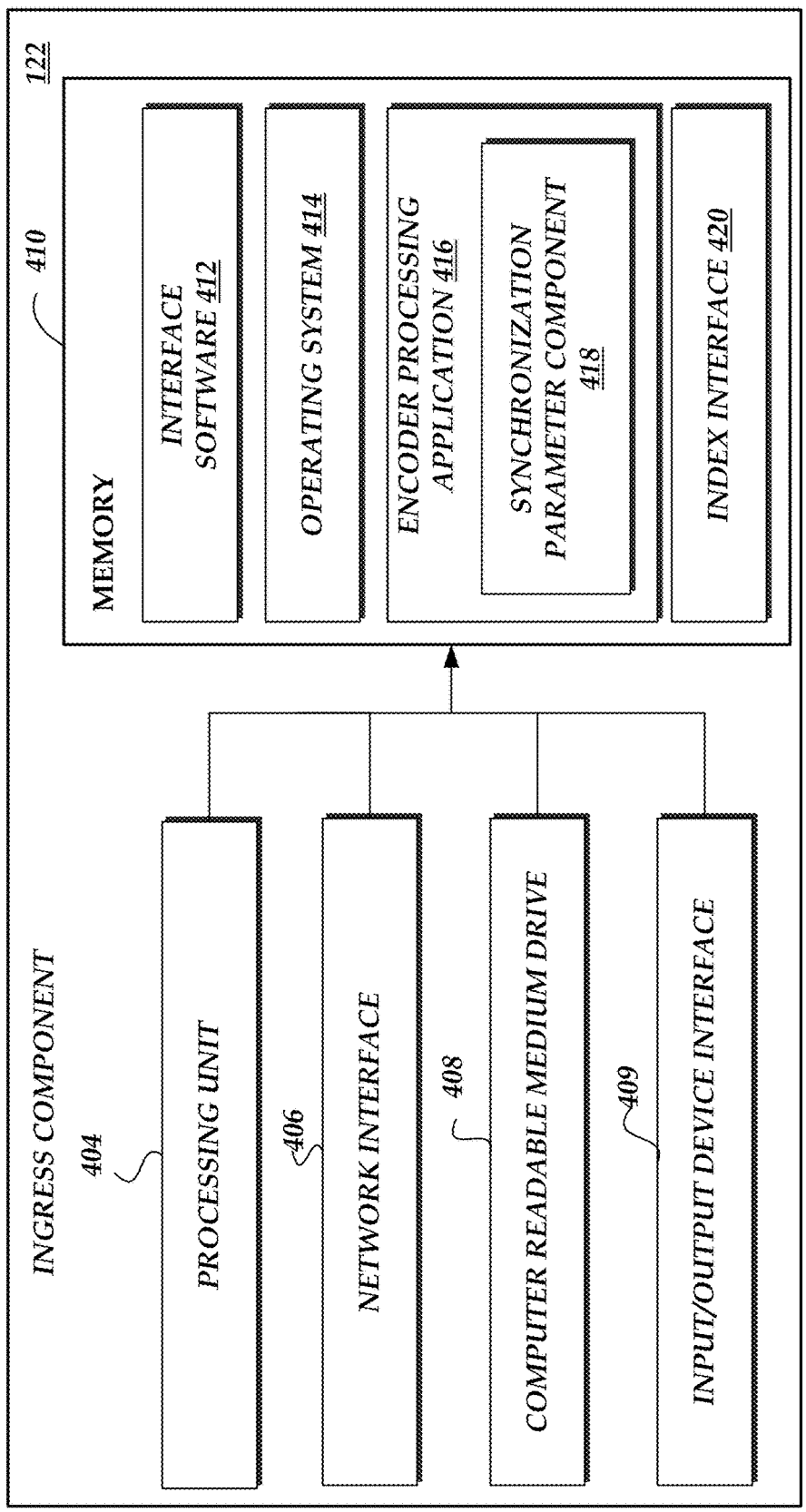
FIG. 4 is a block diagram of illustrative components of an ingress node configured to manage encoder content streams in accordance with an illustrative embodiment.

FIG. 4 depicts one embodiment of an architecture of an illustrative server for functioning as an ingress component 122 as described herein. As described above, the video packaging and origination service 120 includes multiple ingress components 122 (or nodes) that facilitate intake of encoded segments that have been encoded according to different encoding profiles. The general architecture of the ingress component 122 depicted in FIG. 4 includes an arrangement of computer hardware and software components that may be used to implement aspects of the present disclosure. As illustrated, the ingress component 122 includes a processing unit 404, a network interface 406, a computer readable medium drive 408, an input/output device interface 409, all of which may communicate with one another by way of a communication bus. The components of the ingress component 122 may be physical hardware components or implemented in a virtualized environment.

The network interface 406 may provide connectivity to one or more networks or computing systems, such as the network 150 or network 160 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the ingress component 122 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the ingress node. The memory 410 may further include computer program instructions and other information for implementing aspects of the present disclosure. For example, in one embodiment, the memory 410 includes interface software 412 for receiving and processing content from encoders 132. Additionally, the memory 410 includes an encoder processing application 416 for processing incoming encoded content segments. The ingress component 122 can further include a synchronization parameter component 418 for utilizing the synchronization information to generate the deterministic information as described above. Still further, the ingress component 122 can also include an index interface 420 for writing deterministic data or providing deterministic data to generate index of stored content segments.

Figure 5:
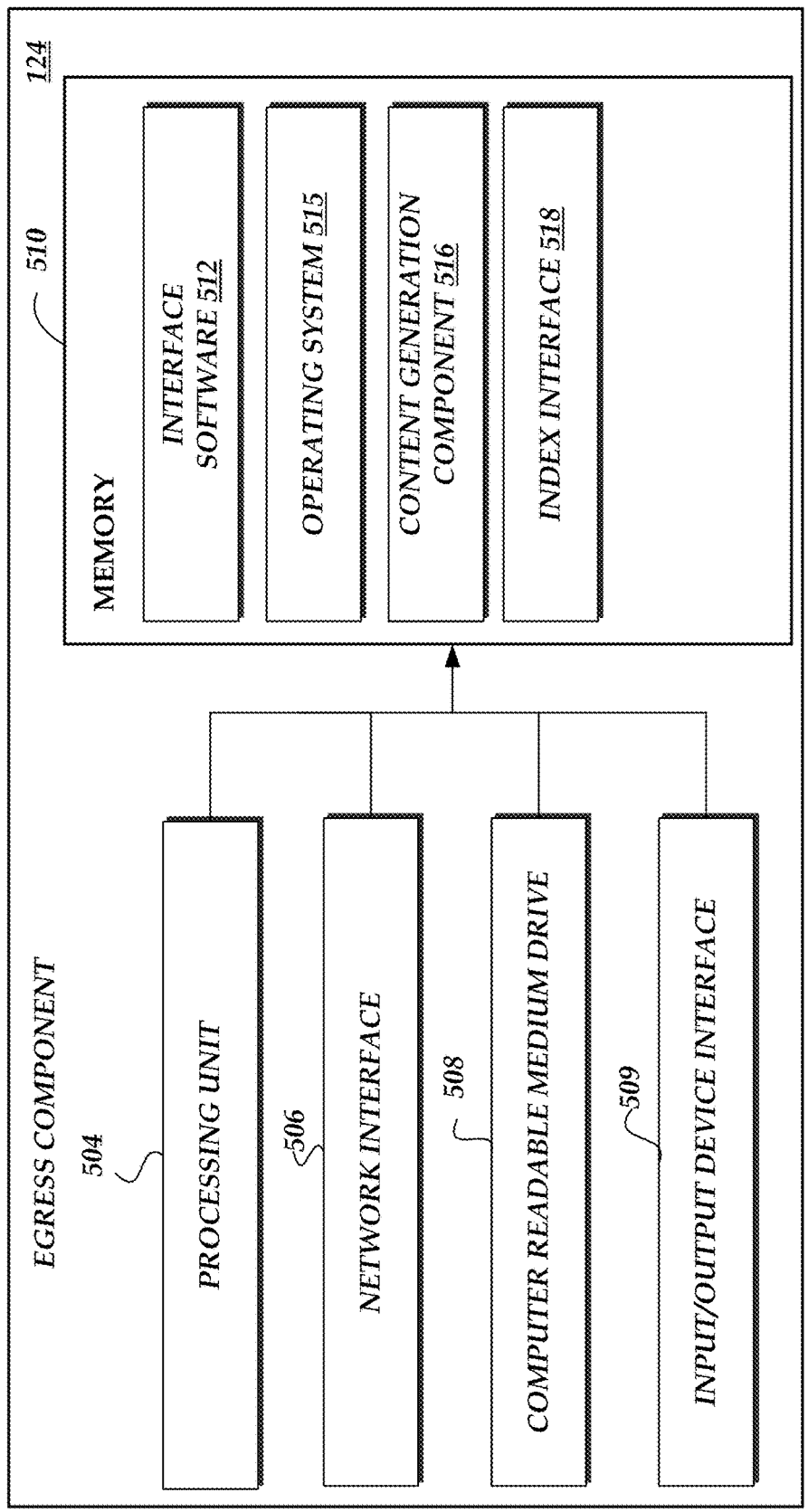
FIG. 5 is a block diagram of illustrative components of an egress node configured to manage content requests from requesting entities in accordance with an illustrative embodiment.

FIG. 5 depicts one embodiment of an architecture of an illustrative server for functioning as an egress component 124 as described herein. As described above, the video packaging and origination service 120 includes multiple egress components 124 (or nodes) that facilitate intake of encoded segment content requests from different requesting entities, such as CDN 110 or user devices 102. The general architecture of the egress component 124 depicted in FIG. 5 includes an arrangement of computer hardware and software components that may be used to implement aspects of the present disclosure. As illustrated, the egress component 124 includes a processing unit 504, a network interface 506, a computer readable medium drive 508, an input/output device interface 509, all of which may communicate with one another by way of a communication bus. The components of the egress component 124 may be physical hardware components or implemented in a virtualized environment.

The network interface 506 may provide connectivity to one or more networks or computing systems, such as the network 150 or network 160 of FIG. 1. The processing unit 504 may thus receive information and instructions from other computing systems or services via a network. The processing unit 504 may also communicate to and from memory 510 and further provide output information for an optional display via the input/output device interface 509. In some embodiments, the egress component 124 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the egress component 124. The memory 510 may further include computer program instructions and other information for implementing aspects of the present disclosure. For example, in one embodiment, the memory 510 includes interface software 512 for receiving and processing content requests from requesting entities. Additionally, the memory 510 includes a content generation component 516 for processing received encoded content segments from an index. Additionally, the egress component 124 can further include an index component 518 for generating the encoded content streams by accessing encoded content segments as identified in the index information as described above.

Figure 6:
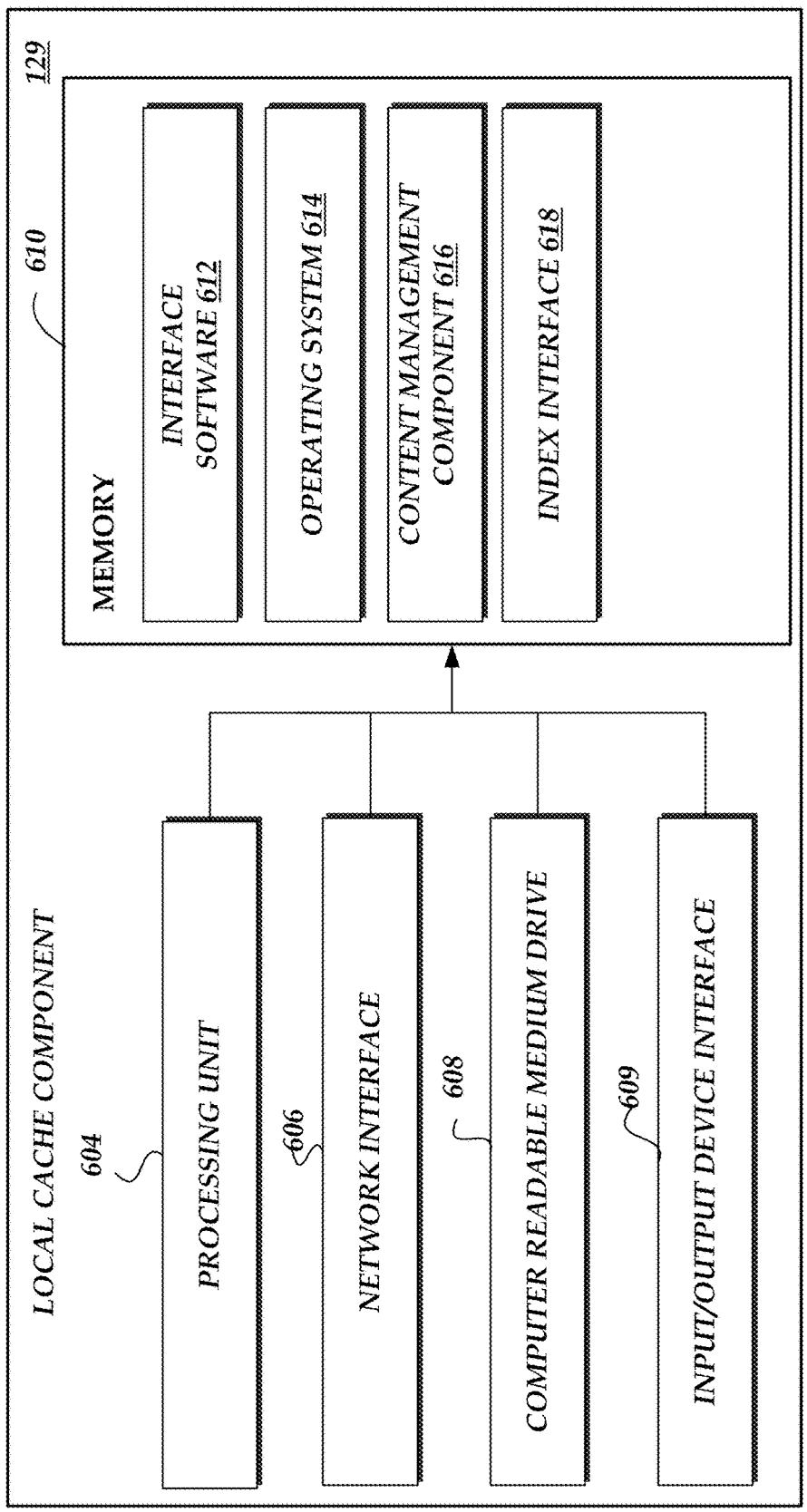
FIG. 6 is a block diagram of illustrative components of a local cache component configured to manage streaming content for processing content requests in accordance with an illustrative embodiment

FIG. 6 depicts one embodiment of an architecture of an illustrative server for functioning as a cache component 129 as described herein. As described above, the video packaging and origination service 120 includes cache components 129 (or nodes) that facilitate the management of content streams to requesting users. Illustratively, the cache components 129 are part of the video packaging and origination service 120 and can be managed in manner to optimize the processing and transmission of content streams to requesting users. The cache components 129 may correspond to local cache components that serve one or more distinct geographic areas. For example, a cache component 129 can have a one-to-one association with a specific geographic region or logical zone and can be optimized according to the attributes of the specific geographic region or logical zone. In another example, a cache component 129 can have a one-to-many association with multiple geographic zones or logical zones and can be optimized to according to the attributes of individual geographic zones or logical or multiple geographic zones or logical zones.

The general architecture of the cache component 129 depicted in FIG. 6 includes an arrangement of computer hardware and software components that may be used to implement aspects of the present disclosure. As illustrated, the cache component 129 includes a processing unit 604, a network interface 606, a computer readable medium drive 608, an input/output device interface 609, all of which may communicate with one another by way of a communication bus. The components of the cache component 129 may be physical hardware components or implemented in a virtualized environment.

The network interface 606 may provide connectivity to one or more networks or computing systems, such as the network 160 or network 160 of FIG. 1. The processing unit 604 may thus receive information and instructions from other computing systems or services via a network. The processing unit 604 may also communicate to and from memory 610 and further provide output information for an optional display via the input/output device interface 609. In some embodiments, the cache component 129 may include more (or fewer) components than those shown in FIG. 6.

The memory 610 may include computer program instructions that the processing unit 604 executes in order to implement one or more embodiments. The memory 610 generally includes RAM, ROM, or other persistent or non-transitory memory. The memory 610 may store an operating system 614 that provides computer program instructions for use by the processing unit 604 in the general administration and operation of the cache component 129. The memory 610 may further include computer program instructions and other information for implementing aspects of the present disclosure. For example, in one embodiment, the memory 610 includes interface software 612 for receiving and processing content caching commands from the content management services 126 and requests from requesting egress servers 124. Additionally, the memory 610 includes a content generation component 616 for processing received encoded content segments from an index for storage. Content generation component 616 also includes or access the mass storage utilized to maintain cached content. Additionally, the ingress component 122 can further include an index interface component 618 for obtaining and processing indexes to identify encoded content segments that make up the requesting encoded content.

Figure 6A:
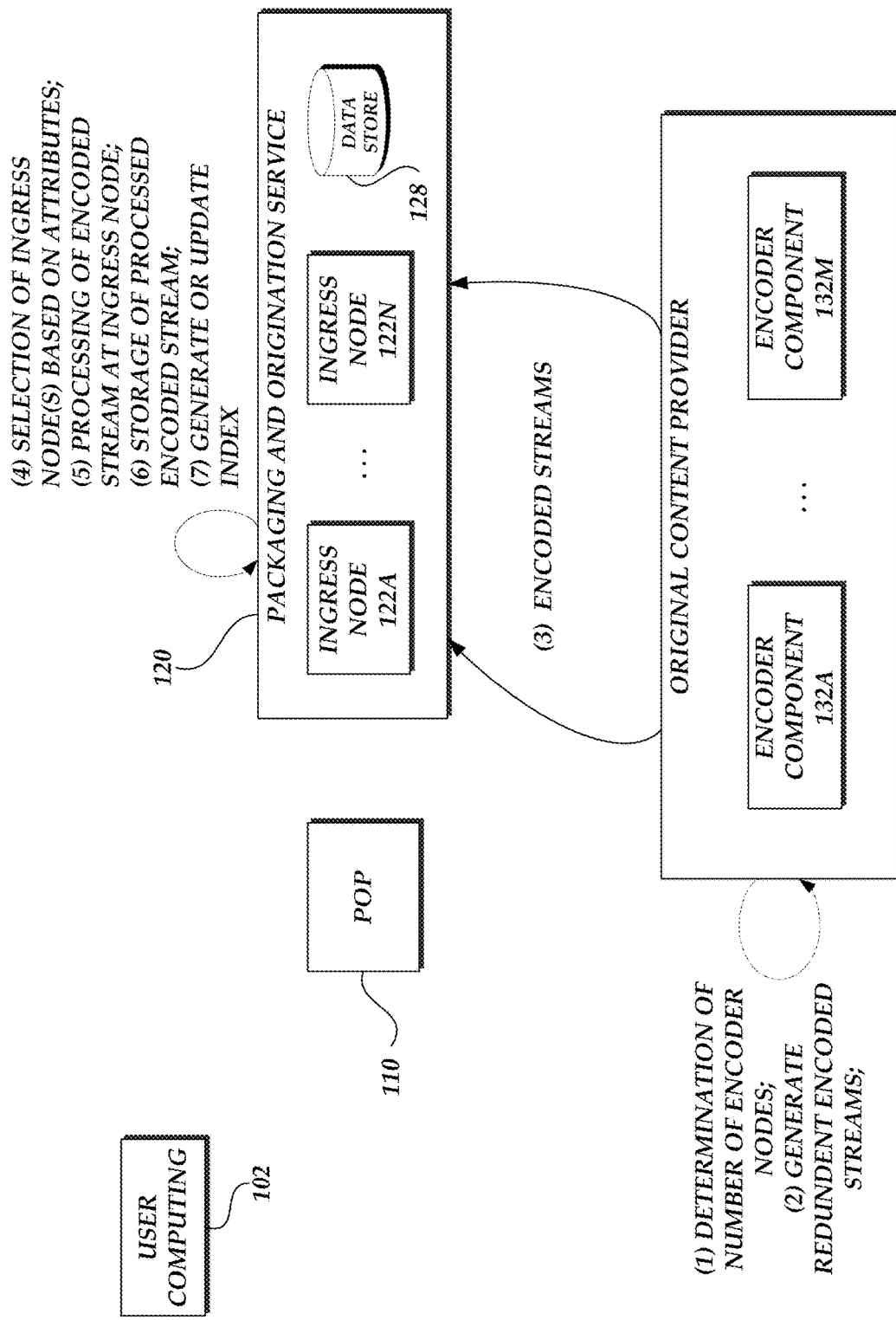
FIGS. 6A-6C are block diagrams of the content delivery environment of FIG. 1 illustrating the interaction related to video packing and origination service for obtaining encoded content for delivery to user devices.
Figure 6B:
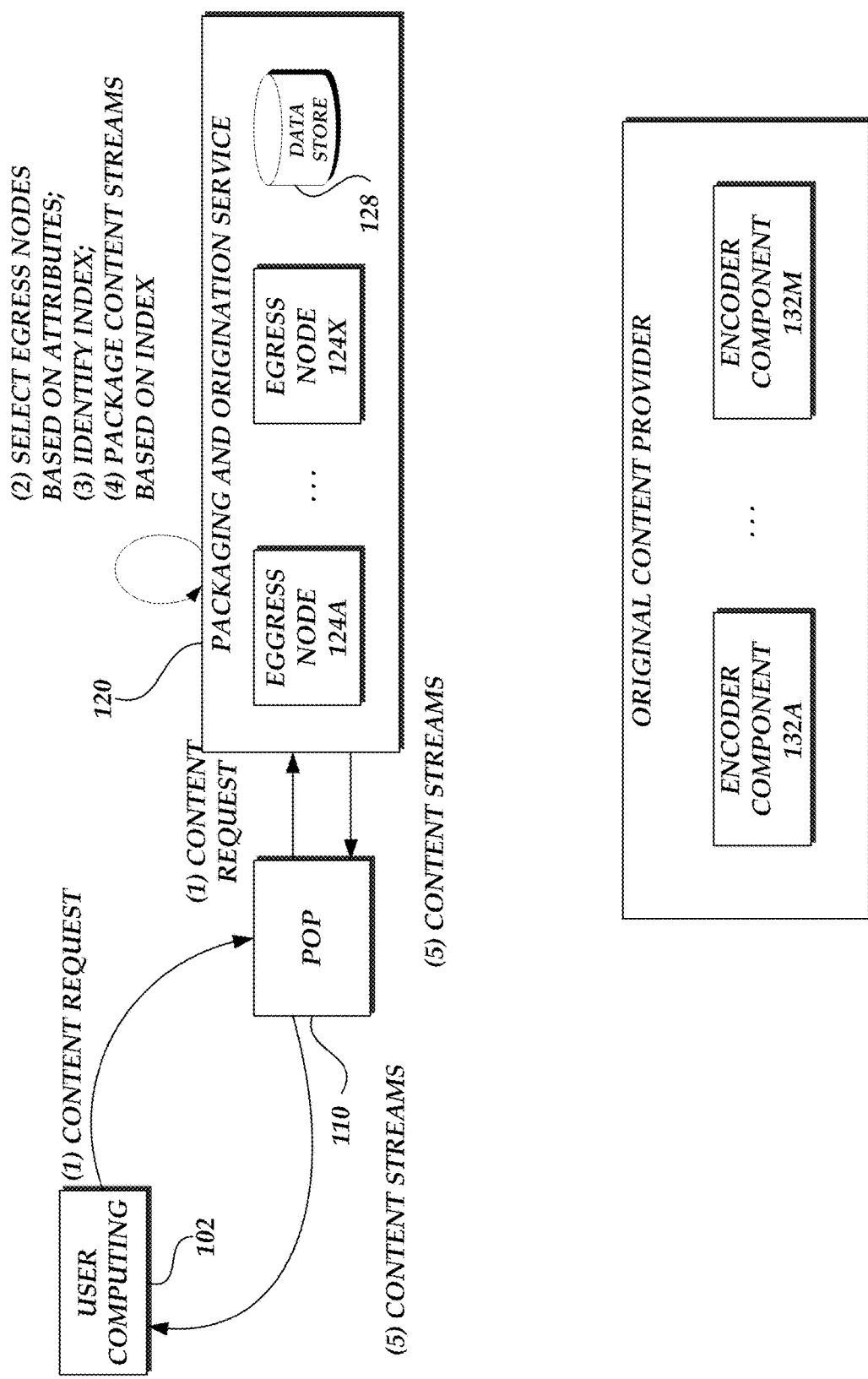
Figure 6C:
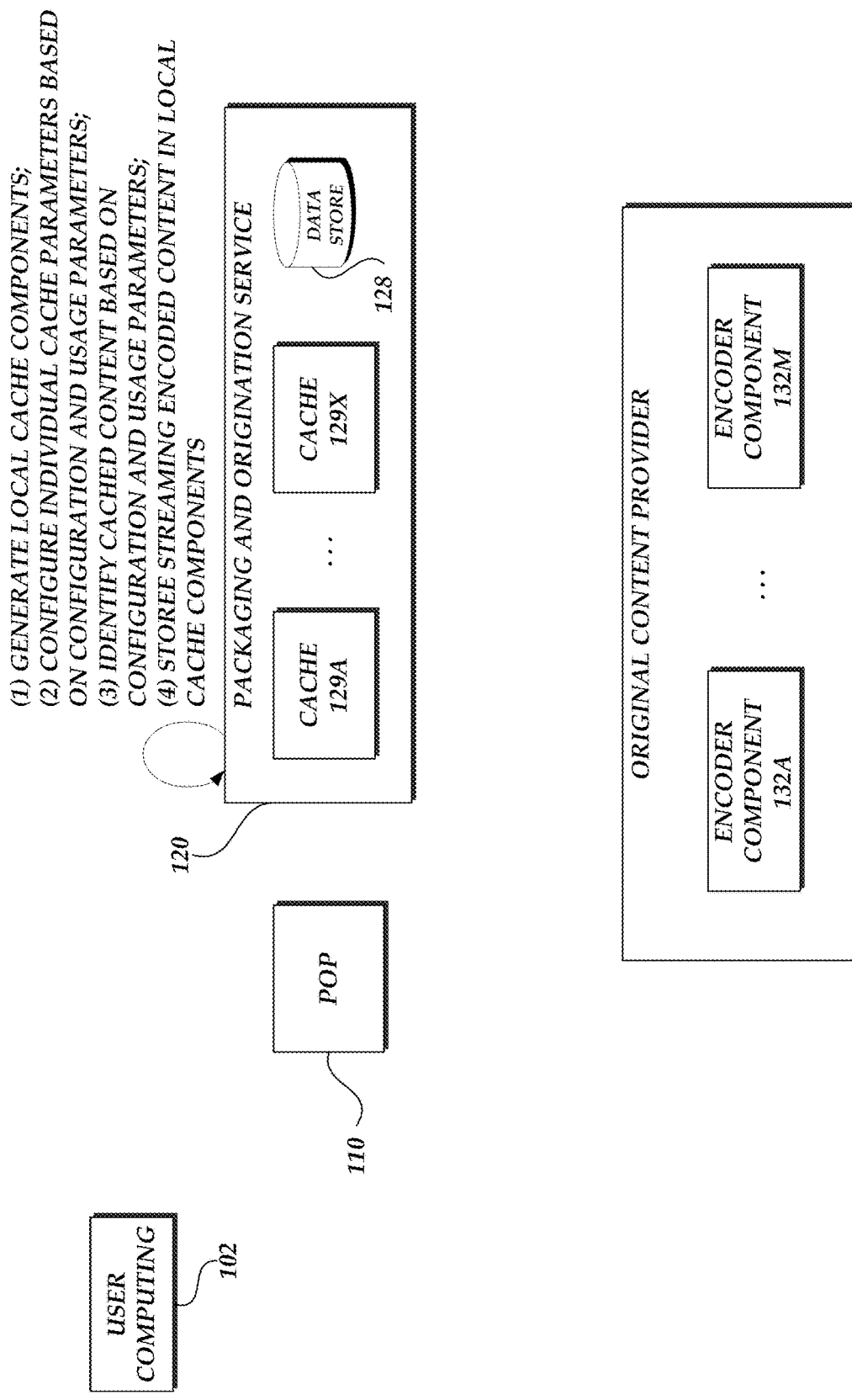

Turning now to FIGS. 6A-6C, an illustrative interaction for the processing of content requests will be described. With reference first to FIG. 6A, at (1), the original content provider 130 determine a number of encoder nodes 132 to transmit a set of encoded content segments. Illustratively, the original content provider 130 can be configured to identify the requested content and the manner of how the encoded content will be transmitted. For example, the original content provider 130 can received configuration information that identifies whether a single encoder will be utilized to transmit encoded streams, whether multiple encoders will be utilized to transmit encoded streams, whether multiple encoders will be utilized to transmit redundant encoded streams, and the like. Although two encoders are illustrated in FIG. 6A, one skilled in the relevant art will appreciate that additional or alternative number of encoders 132 may be utilized.

At (2), the original content provider 130 causes one or more encoders to generate encoded streams based on synchronization information. As described above, the video packaging and origination service 120 may provide synchronization information, such as timestamp information or sequence information that allows multiple encoders to transmit at least some portion of the encoded content. In another embodiment, the original content provider 130 can utilize self-providing synchronization, information provided by a third-party service or a combination. Still further, if a single encoder is utilized, synchronization information may not be required to transmit encoded content to the video packaging and origination service 120. Illustratively, the original content provider 130 (whether through a single or a plurality of encoding servers 132A and 132B) can provide multiple encoder streams that can correspond to individual content streams corresponding to the different requested encoding profiles. For example, a first content stream can correspond to a first encoding bitrate and format (e.g., a first encoding profile) and a second content stream can correspond to a second encoding bitrate and format that is different. At (3), the content provider transmits the one or more content streams.

The video packaging and origination service 120 receives the plurality of incoming encoded content streams from the encoders. More specifically, at (4), the content management service 126, such as via an ingress microservice, selects an ingress node or component 122 based on attributes of the original content provider 130, the video packaging and origination service 120 or a combination. Such attributes may include geographic information, network location or traffic information, user configurations, general service levels, resource load information, and the like. For example, the video packaging and origination service 120 can identify a computing device that will function as the ingress component 122 and that is located in a region or availability zone that is determined to be proximate to the original content provider 130. In another example, the video packaging and origination service 120 can identify a computing device that will function as ingress component 122 and that is associated with sufficient processing resources as anticipated to receive and process incoming content segments. In still another example, the video packaging and origination service 120 can identify a computing device that will function as the ingress component 122 based on the correlation of the target computing device to specific types of content, content providers, or requesting entities.

At (5), the content management system instantiates or causes an instantiated ingress component 122 to receive and process the encoded segments from a first received stream. Illustratively, the ingress component 122 of the video packaging and origination service 120 processes the received encoded segments to generate deterministic data included in a set of meta-data utilized to access and generate outgoing content streams. Illustratively, the deterministic data can include timestamp information related to a time of play of the set of encoded segments, sequence number identifying an order of the encoded content segment in the set of encoded segments, a time of operation of the encoder and the like. The deterministic data will be illustratively utilized to identify a same content segment or matching content segments that have been encoded according to different encoding profiles and received at different ingress components. For example, four content segments sharing a common timestamp of play but encoded according to the different encoding profiles are considered to be the same content segment. The ingress component 122 can also format or translate the incoming content to generate different encoding bitrate and format combinations or packages. In another example, the ingress component 122 or content management service 126 can conduct quality or error checking that can be included in meta-data.

At (6), the ingress component 122 stores the encoded data stream. Illustratively, the ingress component 122 may store all received encoded content regardless of whether it is duplicative or alternative to what will be used by the video packaging and origination service 120. As will be described in greater detail below, the ingress component 122 can illustratively utilize local storage resources to maintain the received encoded content segments regardless of whether the local storage resources maintain all the received encoded content segments. At (7), the ingress component 122 causes the generation or updating of an index identifying the location of the received encoded content. As will be described below, the index will be utilized by a separate egress component 124 to respond to content requests from requesting entities. Illustratively, the index may be made up of one or more files that include relevant identifiers utilized by the video packaging and origination service 120 to identify the storage location of the received and processed encoded components. In some embodiments, the index files may be serialized in a manner to facilitate transmission of the index to other computing devices or storage in memory.

With reference now to FIG. 6B, interactions between components of the content delivery environment 100 illustrating the processing of streaming content requests from requesting entities will be described. At (1), the user device directly or through POP 110 transmits a request for encoded content to the video packaging and origination service 120. The interaction between the requesting entities and the video packaging and origination service 120 can include multiple interactions to identify available content and receive request for content. For example, a user device 102 may generate various user interfaces or software applications that facilitate the selection of content that are directed to the video packaging and origination service 120. As illustrated in FIG. 6B, the content requests from user devices 102 may be transmitted via a POP 110 or alternatively be transmitted directly from user devices 102 to the video packaging and origination service 120.

Illustratively, the video packaging and origination service 120 receives one or more requests for encoded content streams from requesting entities. To begin processing the content requests, at (2), the content management service 126 selects an egress node or component 124 based on attributes of the requesting entity (user 102 or POP 110), the video packaging and origination service 120 or a combination. Such attributes may include geographic information, network location or traffic information, user configurations, general service levels for delivery of content, technical configuration information, and the like. For example, the video packaging and origination service 120 can identify a computing device that will function as the egress component 124 and that is located in a region or availability zone that is determined to be proximate to the requesting entity. In another example, the video packaging and origination service 120 can identify a computing device that will function as egress component 124 and that is associated with a communication latency that meets a service level agreement threshold or that is specified by a user. In still a further example, the video packaging and origination service 120 can select an egress component 124 that is optimized for the transmitting content streams to a particular requesting entity, such as by custom communication protocol or security requirements. Illustratively, the video packaging and origination service 120 can utilize the same criteria (or different criteria) as the criteria utilized to identify the ingress component 122 (FIG. 6A), but the evaluation of the criteria may yield identification of the different computing devices based on consideration of the differences in attributes between a content source 130 and the requesting entities.

At (3), the content management system instantiates or causes an instantiated egress component 124 to identify and process the index of the encoded segment requests from a first received stream. Illustratively, the egress component 124 of the video packaging and origination service 120 processes the received index to identify the storage location of the encoded segments previously processed and stored by the ingress components 122. The egress component 124 can access an index that is available in a known storage location or that is otherwise made available to the egress component 124.

At (4), the egress component 124 packages the encoded content to generate the content streams based on the identified storage location of the encoded data stream. In this regard, the egress component 124 can dynamically access individual encoded content segments at different storage locations associated with ingress components 122. The packing of the encoded content segments for transmission as encoded content streams (e.g., encoded bitrate and format) can occur at the time of request which facilitates the management of individual encoded content segments (e.g., removing one segment for another). At (5), the egress component 124 causes the transmission of the content responsive to the content request. One skilled in the relevant art will appreciate that the transmission of content segments to requesting entities can include a number of interactions and considerate of the specific protocols implemented to stream content.

With reference now to FIG. 6C, the generation of distributed caching resources by the video packaging and origination service 120 will be described. At (1), the content management service 126 selects and generates local cache components based on attributes of the requesting entity (user 102 or POP 110), the video packaging and origination service 120 or a combination. Such attributes may include geographic information, network information, user configurations, general service levels, storage requirements, and the like. Illustratively, the video packaging and origination service 120 can maintain a cache component in identified regions or availability zones to facilitate the delivery of content. Additionally, the local cache components may be instantiated by the video packaging and origination service 120 in a manner that facilitates that management of the cache components. As will be described in greater detail, one or more aspects of individual local cache components can be optimized based on usage and configuration information.

At (2), the video packaging and origination service 120 configures the individual properties of the cache component based on the received usage and configuration information. In one embodiment, the video packaging and origination service 120 can allocate different amounts of the cache data storage based on a characterization of the content streams, such as a characterization of quality, popularity, importance, and the like. The usage and configuration information may include information from the content provider 130, similar subject matter, user information, and the like. For example, the video packaging and origination service 120 can identify content that has been characterized as heavily in demand based on historical information indicative request load. In such an example, the video packaging and origination service 120 can configure one or more local cache components to process the indexes to make the encoded content available for streaming. In another example, the egress component 122 may provide the usage and configuration information to the video packaging and origination service 120 to facilitate the local caching of content streams, such as content streams predicted to be popular or in which minimum service delivery levels are required.

At (3), the video packaging and origination service 120 identifies cache content based on usage and configuration information. For example, the video packaging and origination service 120 can identify content that should be included in the cache data storage based on a characterization of the content streams, such as a characterization of quality, popularity, importance, and the like. As described above, the usage and configuration information may include information from the content provider 130, similar subject matter, user information, and the like. For example, the video packaging and origination service 120 can allocate greater portions of cache content for content associated with a content provider that is characterized as popular to facilitate increase delivery of such content. At (4), the video packaging and origination service 120 collects the encoded information from the index and causes individual caching stores to be updated. In some embodiments, the video packaging and origination service 120 can modify traditional caching mechanisms that would either not add content to cache components without first receiving a request or that would otherwise associate a time to live the cached content.

Figure 7:
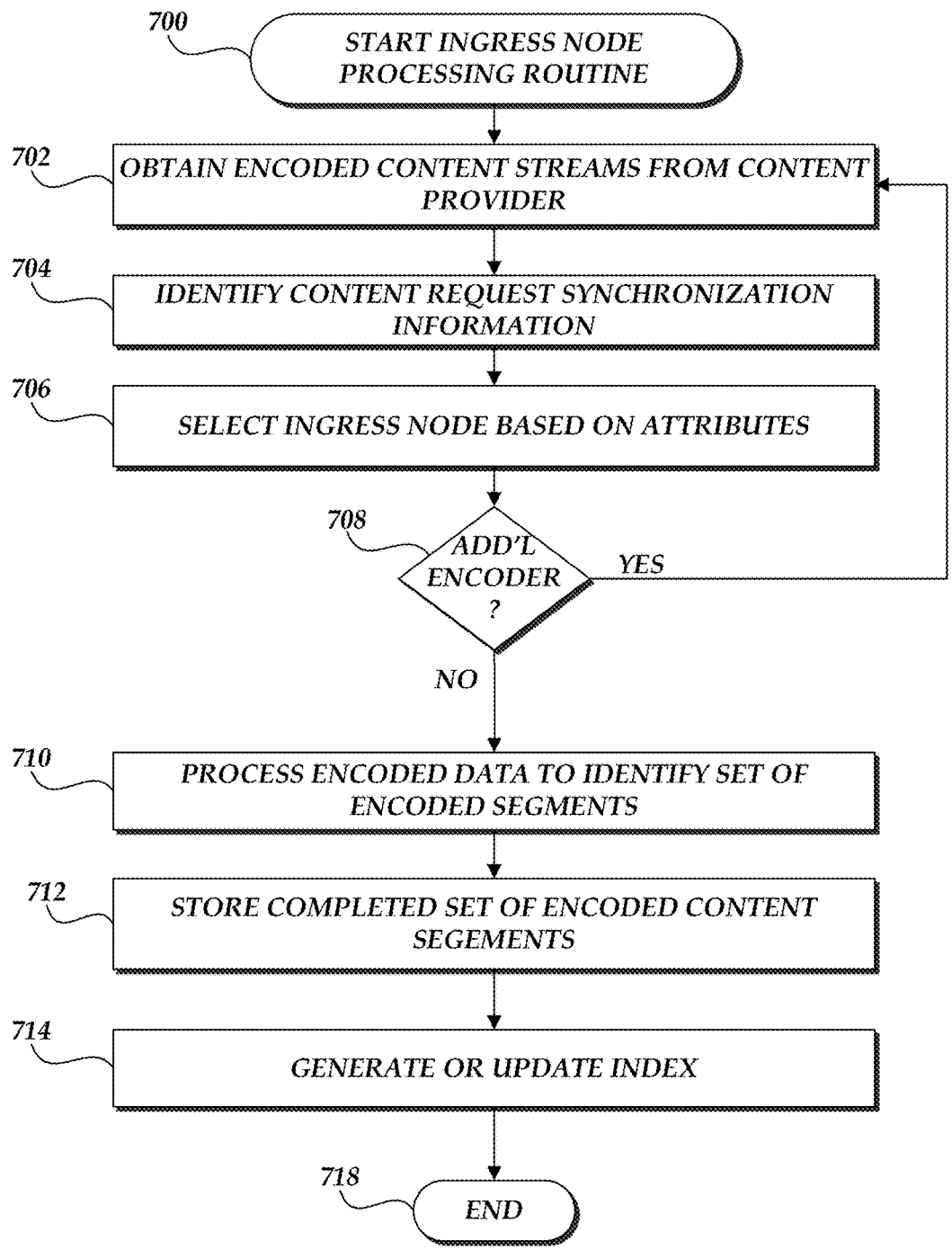
FIG. 7 is a flow diagram illustrative of an ingress component routine implemented by a video packaging and origination service.

Turning now to FIG. 7, a routine 700 utilized by the video packaging and origination service 120 to receive and process encoder streams will be described. Routine 700 may be illustratively implemented by the video packaging and origination service 120, including one or more an ingress components 122. Illustratively, routine 700 will begin once the original content provider 130 begins transmitting a plurality of encoded content streams to the video packaging and origination service 120 and incorporating received/accessed synchronization information. As described above, the synchronization information may be utilized by the original content provider 130 and video packaging and origination service 120 to transmit and receive encoded content from multiple encoders. If a single encoder is utilized by the original content provider 130, the synchronization information may be omitted. In some embodiments, the original content provider 130 may be configured to transmit different content streams corresponding to a common encoded segment or set of segments encoded according to different encoding profiles. In other embodiments, the original content provider 130 can be configured to transmit redundant content streams to the video packaging and origination service 120.

At block 702, the video packaging and origination service 120 obtains content stream data from an original content provider. As described above, the content stream data may be transmitted by the original content provider 130 responsive to a request from a user device 102, a request from the video packaging and origination service 120, or other request/trigger. At block 704, the video packaging and origination service 120 can optionally transmit synchronization information to the original content provider 130. Illustratively, the synchronization information is utilized by multiple encoders 132 to allow encoded segments from multiple encoders to be combined seamlessly or substantially seamlessly. For example, the synchronization information can include timestamp information related to a relative timestamp of individual encoded segments in the set of encoded segments. In another example, the synchronization information can include sequence numbers for the individual segments. In another example, the synchronization information can include a time of operation or other time elapsed information. The synchronization information is incorporated into the encoded segments and then utilized by the video packaging and origination service 120 to assemble the set of ordered segments, remove duplicates and identifying missing encoded segments. In embodiments in which the video packaging and origination service 120 does not transmit synchronization information, such as if the original content provider 130 or other service provides the synchronization information, block 704 may be omitted.

At block 706, the content management system instantiates an ingress component 122 or causes an instantiated ingress component 122 to receive and process the encoded segments from a first received stream. In selecting the ingress component 122, the content management service 126, such as via an ingress microservice, selects an ingress node or component 122 based on attributes of the original content provider 130, the video packaging and origination service 120 or a combination. Such attributes may include geographic information, network location or traffic information, user configurations, general service levels, resource load information, and the like. For example, the video packaging and origination service 120 can identify a computing device that will function as the ingress component 122 and that is located in a region or availability zone that is determined to be proximate to the original content provider 130. In another example, the video packaging and origination service 120 can identify a computing device that will function as ingress component 122 and that is associated with sufficient processing resources as anticipated to receive and process incoming content segments. In still another example, the video packaging and origination service 120 can identify a computing device that will function as the ingress component 122 based on the correlation of the target computing device to specific types of content, content providers, or requesting entities. In a further example, the video packaging and origination service 120 can utilize financial information, such as pricing plans or an attributed cost per transmission, specified by the original content provider 130 or the requesting entities to select an ingress component 122.

Illustratively, the ingress component 122 of the video packaging and origination service 120 processes the received encoded segments to generate deterministic data. Illustratively, the deterministic data can include timestamp information related to a time of play of the set of encoded segments, sequence number identifying an order of the encoded content segment in the set of encoded segments, a time of operation of the encoder and the like. The deterministic data will be illustratively utilized to identify a same content segment or matching content segments that have been encoded according to different encoding profiles and received at different ingress components. For example, four content segments sharing a common timestamp of play but encoded according to the different encoding profiles can be considered to be the same content segment.

At decision block 708, a determination is made as to whether additional encoder segments streams still need to be received. As described above, the video packaging and origination service 120 performs a determination if encoded segments determined to be matching correspond to all the anticipated encoded profiles. For example, to enable variable bitrate encoding, requesting entities may be offered encoded content segments according to five different encoding profiles. Accordingly, the video packaging and origination service 120 could determine via the deterministic information whether there are five matching segments covering the five requested encoding profiles. If additional encoded segments remain unreceived or not fully processed, the routine 700 returns to block 702 to receive the additional encoder streams. If not, the routine 700 proceeds to block 710.

At block 710, the ingress component 122 processes the received encoded segments. For example, the video packaging and origination service 120 can be adjustments or error correction for any of the selected encoded segments. In other embodiment, if the synchronization information does not ensure perfectly compatible encoded segments, the video packaging and origination service 120 can extrapolate additional segments or portions to facilitate combination. In another embodiment, the processed encoded segments can include the generation or translation of the encoded content to correspond to different encoding profiles, such as different combinations of encoding bitrate and format.

At block 712, the ingress component 122 stores the encoded data stream. Illustratively, the ingress component 122 may store all received encoded content regardless of whether it is duplicative or alternative to what will be used by the video packaging and origination service 120. At block 714, the ingress component 122 causes the generation or updating of an index identifying the location of the received encoded content. As will be described below, the index will be utilized by a separate egress component 124 or local cache components 129 to respond to content requests from requesting entities. Illustratively, the index may be made up of one or more files that include relevant identifiers utilized by the video packaging and origination service 120 to identify the storage location of the received and processed encoded components. In some embodiments, the index files may be serialized in a manner to facilitate transmission of the index to other computing devices or storage of the index for access by the additional components of the video packaging and origination service 120.

In some embodiments, the video packaging and origination service 120 can continue to update the index on a periodic basis. For example, if one or more encoded segments are determined to have an error, the video packaging and origination service 120 can receive a different version of the encoded segment from the original content provider 130 or otherwise identify a redundant version of the encoded segment and update the index accordingly. Similarly, if a specific ingress component 122 may be considered offline or unable to process requests or the storage location associated with stored encoded segments blocks becomes unavailable or beyond capacity to service additional information, the video packaging and origination service 120 can select additional or redundant versions of the encoded segment that have been processed and update the index accordingly. At block 716, routine 700 terminates or starts a new iteration of routine 700.

Figure 8:
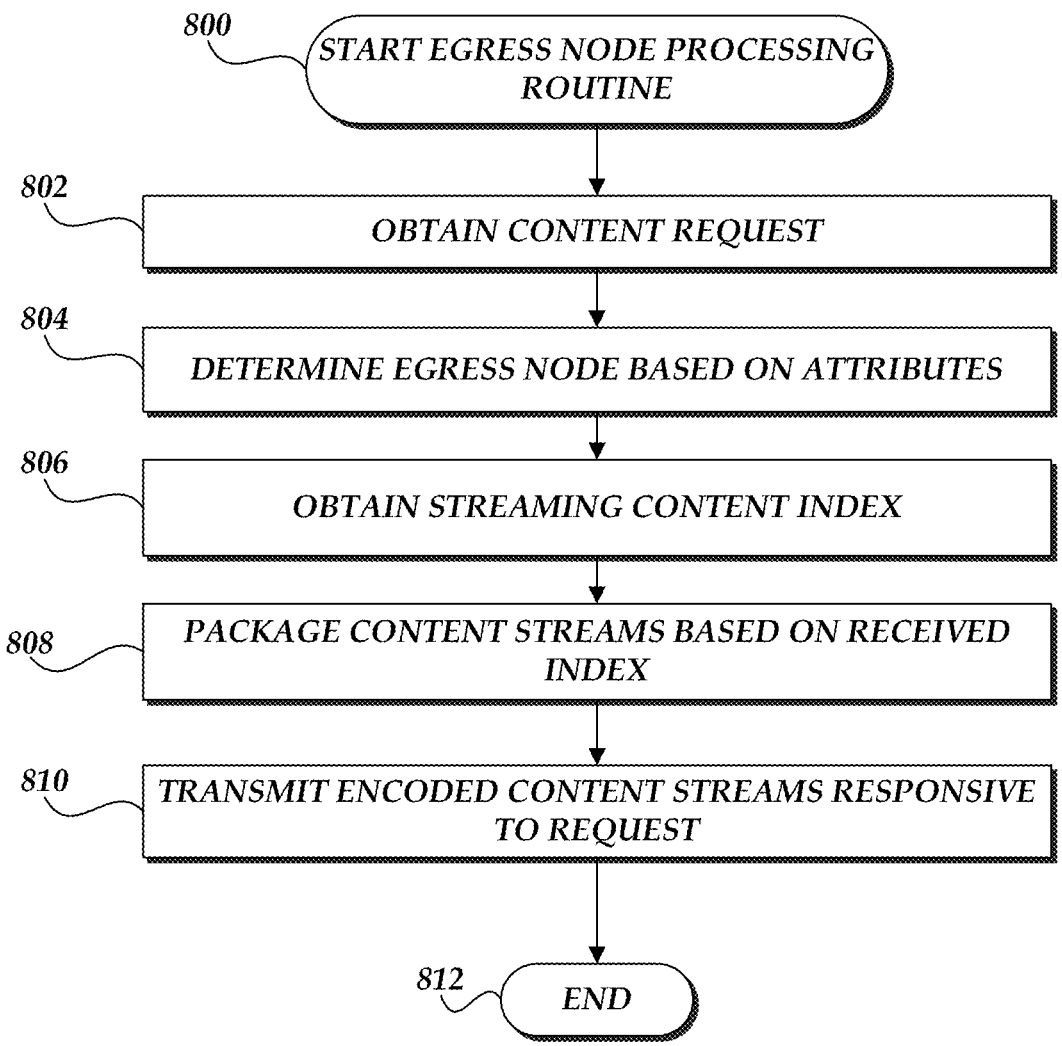
FIG. 8 is a flow diagram illustrative of an egress component routine implemented by a video packaging and origination service.

Turning now to FIG. 8, a routine 800 utilized by the video packaging and origination service 120 to select an egress component 124 and process requests for content will be described. At block 802, the video packaging and origination service 120 receives content requests from a requesting entity. Illustratively, the user device directly or through CDN 110 transmits a request for encoded content to the video packaging and origination service 120. The interaction between the requesting entities and the video packaging and origination service 120 can include multiple interactions to identify available content and receive request for content. For example, a user device 102 may generate various user interfaces or software applications that facilitate the selection of content that are directed to the video packaging and origination service 120. As illustrated in FIG. 6B, the content requests from user devices 102 may be transmitted via a CDN 110 or alternatively be transmitted directly from user devices 102 to the video packaging and origination service 120.

Illustratively, the video packaging and origination service 120 receives one or more requests for encoded content streams from requesting entities. To begin processing the content requests, at block 804 the content management service 126 selects an egress node or component 124 based on attributes of the requesting entity (user 102 or POP 110), the video packaging and origination service 120 or a combination. Such attributes may include geographic information, network information, user configurations, general service levels, and the like. For example, the video packaging and origination service 120 can identify a computing device that will function as the egress component 124 and that is located in a region or availability zone that is determined to be proximate to the requesting entity. In another example, the video packaging and origination service 120 can identify a computing device that will function as egress component 124 and that is associated with a communication latency that meets a service level agreement threshold or that is specified by a user. In a further example, the video packaging and origination service 120 can utilize financial information, such as pricing plans or an attributed cost per transmission, specified by the requesting entities or original content provider 130 to select an egress component 122. In such an example, the egress component 124 may be selected based on levels of performance and costs attributed to the performance. Illustratively, the video packaging and origination service 120 can utilize the same criteria (or different criteria) as the criteria utilized to identify the ingress component 122 (FIG. 6A), but the evaluation of the criteria may yield identification of the different computing devices based on consideration of the differences in attributes between a content source 130 and the requesting entities.

At block 806, the content management system instantiates or causes an instantiated egress component 124 to identify and process the index of the encoded segment requests from a first received stream. Illustratively, the egress component 124 of the video packaging and origination service 120 processes the received index to identify the storage location of the encoded segments previously processed and stored by the ingress components 122. As described above, in some embodiments, the identification and processing of the index is completed substantially contemporaneously with the processing of the content request. Accordingly, the generation of the encoded content segments package that form the content stream is dynamic and can be adjusted by the video packaging and origination service 120. As described above, the dynamic packaging of encoded content segments mitigates the need to store all the packages for each egress component locally until requested and for the management of the content segments identified in the index.

At block 808, the egress component 124 compiles or packages the encoded content to be provided based on the identified storage location of the encoded data stream. As described above, the generation of the packages are illustratively completed substantially in real time and responsive to the request for the content, which facilitates the management of the encoded content. At block 810, the egress component 124 causes the transmission of the content responsive to the content request. One skilled in the relevant art will appreciate that the transmission of content segments to requesting entities can include a number of interactions and considerate of the specific protocols implemented to stream content. Routine 800 terminates at block 812 or initiates a new iteration of routine 800.

Figure 9:
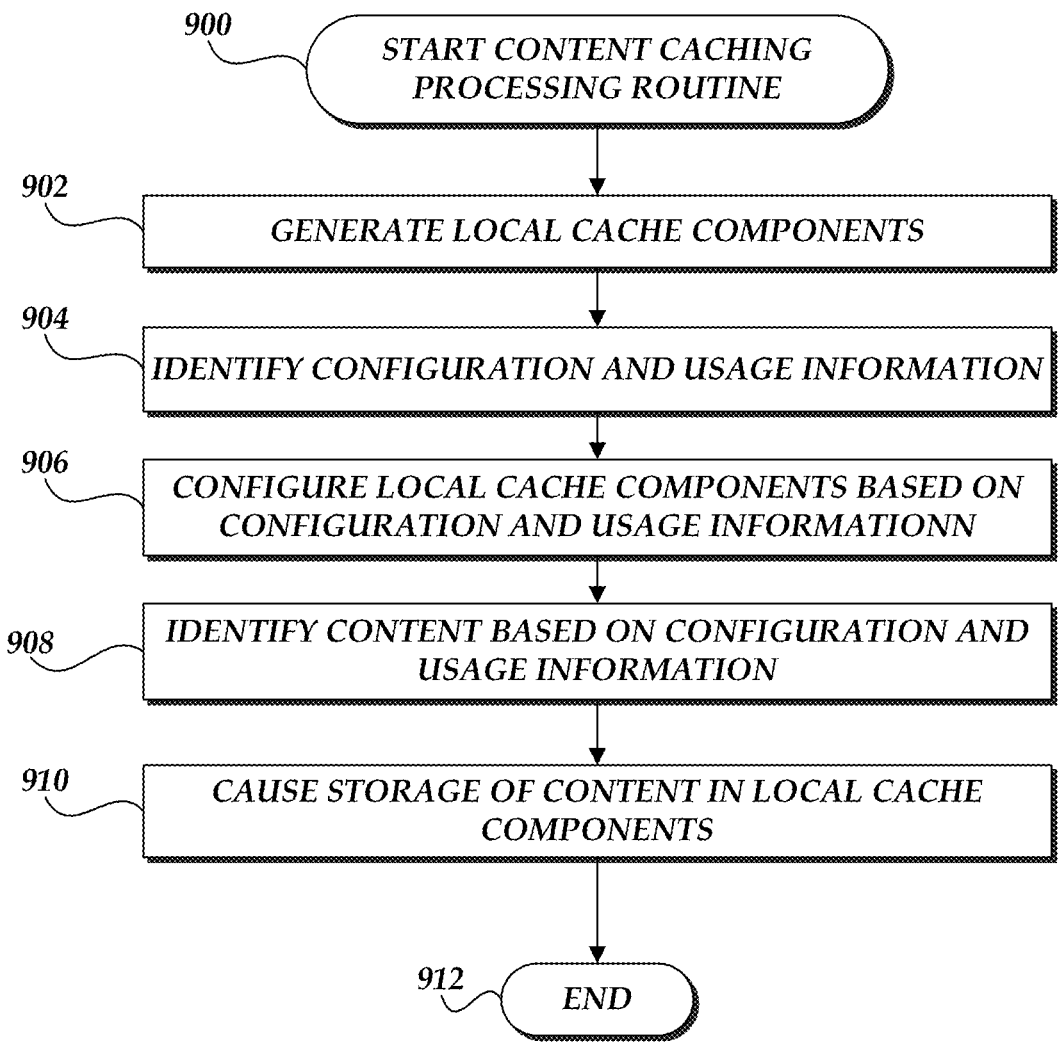
FIG. 9 is a flow diagram illustrative of a content caching routine implemented by a video packaging and origination service.

Turning now to FIG. 9, a routine 900 utilized by one or more local cache components 129 in the video packaging and origination service 120 will be described. At block 902, the content management service 126 (or other service) selects and generates local cache components 129 based on attributes of the requesting entity (user 102 or POP 110), the video packaging and origination service 120 or a combination. Such attributes may include geographic information, logical network information, user configurations, general service levels, and the like. For example, the video packaging and origination service 120 may utilize latency measurements for content streams to determine the number of local cache components 129 that may be required.

Illustratively, the video packaging and origination service 120 can maintain a cache component 129 in identified regions or availability zones to facilitate the delivery of content. In one embodiment, the local cache components 129 can correspond to a one-to-one relationship with a geographic zone or logical network zone. In another embodiment, the local cache components 129 can correspond to a one-to-many relationship with multiple geographic zones or logical network zones. Additionally, the local cache components may be instantiated by the video packaging and origination service 120 in a manner that facilitates that management of the cache components. As will be described in greater detail, one or more aspects of individual local cache components can be optimized based on configuration and usage information.

At block 904, the video packaging and origination service 120 obtains usage and configuration information regarding content delivery. The usage and configuration information may include historical information regarding previous requesting entity requests associated with the original content provider 130, similar subject matter or subject matter characterizations, user specified-information, such as request metrics, preferences, ratings, descriptions, and the like. At block 906 the video packaging and origination service 120 configures the individual properties of the cache component 129 based on at least a portion of the usage and configuration information. In one embodiment, the video packaging and origination service 120 can allocate different amounts of the cache data storage based on a characterization of the content streams, such as a characterization of quality, popularity, importance, and the like. For example, the video packaging and origination service 120 can identify content that has been characterized as heavily in demand based on historical information indicative request load. In such an example, the video packaging and origination service 120 can configure a threshold amount of memory of one or more local cache components 129 to maintain content associated with the characterization of quality, popularity, importance, etc. In another example, the video packaging and origination service 120 can adjust timing information associated with cached content, such as a time to live, for content matching the characterization of quality, popularity, important, etc. Illustratively, the usage and configuration information may correspond to individual geographic zones such that multiple local cache components 129 may be associated with different usage and configuration information. In other embodiments, the video packaging and origination service 120 may group different combinations of usage and configuration information to include all geographic zones or sub-combinations of geographic zones.

At block 908, the video packaging and origination service 120 identifies cache content based on usage and configuration information. For example, the video packaging and origination service 120 can identify content that should be included in the cache data storage based on a characterization of the content streams, such as a characterization of quality, popularity, importance, and the like. As described above, the usage and configuration information may include information from the content provider 130, similar subject matter, user information, and the like. For example, the video packaging and origination service 120 can allocate greater portions of cache content for content associated with identified original content providers 130 that have been characterized as generating popular content or that have otherwise contractually specified to have content caching. In another example, the video packaging and origination service 120 can utilize relationships between content streams, such as serial content (e.g., television programming) or movie serials to determine the content streams that will be cached. In still a further example, the video packaging and origination service 120 can receive inputs from the original content provider 130, the ingress components 122, or egress components 124 that include mechanisms for identification of content to be cached.

At block 910, the video packaging and origination service 120 collects the encoded information from the index and causes individual caching stores to be updated. In some embodiments, the video packaging and origination service 120 can modify traditional caching mechanisms that would either not add content to cache components without first receiving a request or that would otherwise associate a time to live the cached content. Routine 900 terminates at block 912 or starts a new iteration of routine 900.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage streaming content comprising:
   one or more computing devices associated with a set of available ingress nodes, wherein at least a portion of the set of available ingress nodes corresponds to a plurality of geographic zones and wherein the set of available ingress nodes processes encoded segments from received encoded content streams to generate deterministic data, identifies same content segments using the deterministic data, stores the encoded segments, and updates an index identifying locations of the encoded segments, the locations associated with at least a portion of the set of available ingress nodes;
   one or more computing devices associated with a set of available egress nodes, wherein at least a portion of the set of available egress nodes correspond to a plurality of geographic zones, and wherein the set of available egress nodes identifies the locations of the encoded segments, accesses the encoded segments at the identified locations that are associated with the at least a portion of the set of available ingress nodes, packages encoded content to be provided based on the accessed encoded segments, and transmits the packaged content responsive to content requests; and
   one or more computing devices associated with a content management system, wherein the content management system is configured to:
      receive a content stream from a content provider, wherein the content stream corresponds to a set of encoded segments encoded according to one or more encoding profiles;
      select an ingress node from the set of available ingress nodes based on attributes of the content provider and the content management system;
      receive a request for streaming content from a requesting entity; and
      select an egress node from the set of available egress nodes based on attributes of the requesting entity and the content management system;
   wherein the content management system receives meta-data from the selected ingress node and utilizes the meta-data to make at least a portion of the set of encoded segments corresponding to the requested streaming content accessible to the selected egress node.

2. The system of claim 1, wherein the content management system is further configured to cause instantiation of at least one of an ingress node or an egress node.

3. The system of claim 1, wherein the requesting entity is one of a user device or content delivery service provider.

4. The system of claim 1, wherein the content management system generates an index based on individual meta-data associated with processed encoded content segments.

5. A computer-implemented method to manage transmission of content at a video packaging service comprising:
   receiving one or more content streams from a content provider, wherein individual content streams correspond to a set of encoded segments encoded according to one or more encoding profiles;

identifying one or more ingress nodes from a set of available ingress nodes of a plurality of ingress nodes based on attributes of the content provider and a video packaging service;

receiving a request for streaming content from a requesting entity; and identifying an egress node from a set of available egress nodes of a plurality of egress nodes based on attributes of the requesting entity and the video packaging service;

wherein the one or more identified ingress nodes generate information corresponding to a processing of encoded content segments;

wherein the plurality of ingress nodes processes encoded segments from received encoded content streams, stores the encoded segments, and updates an index identifying locations of the encoded segments; and wherein the plurality of egress nodes identifies the locations of the encoded segments, packages encoded content to be provided based on the identified locations of the encoded segments, and transmits the packaged content responsive to content requests.

6. The computer-implemented method of claim 5, wherein identifying one or more ingress nodes from the set of available ingress nodes based on attributes of the content provider and the video packaging service includes identifying one or more ingress nodes based on geographic attributes of at least one of the content provider or the video packaging service.

7. The computer-implemented method of claim 5, wherein identifying one or more egress nodes from the set of available egress nodes based on attributes of the requesting entity and the video packaging service includes identifying one or more egress nodes based on geographic attributes of at least one of the requesting entity or the video packaging service.

8. The computer-implemented method of claim 5, wherein identifying one or more ingress nodes from the set of available ingress nodes based on attributes of the content provider and the video packaging service includes identifying one or more ingress nodes based on content type.

9. The computer-implemented method of claim 5, wherein identifying one or more egress nodes from the set of available egress nodes based on attributes of the requesting entity and the video packaging service includes identifying one or more egress nodes based on content type.

10. The computer-implemented method of claim 5, wherein identifying one or more ingress nodes from the set of available ingress nodes based on attributes of the content provider and the video packaging service includes identifying a load associated with processing encoded content and selecting an ingress server based on the identified load.

11. The computer-implemented method of claim 5, wherein identifying one or more egress nodes from the set of available egress nodes based on attributes of the requesting entity and the video packaging service includes identifying a load associated with processing encoded content requests and selecting an egress server based on the identified load.

12. The computer-implemented method of claim 5, wherein identifying one or more ingress nodes from the set of available ingress nodes based on attributes of the content provider and the video packaging service includes associating an ingress node with one or more encoder components of the content provider.

13. The computer-implemented method of claim 5 further comprising generating an index based on individual meta-data associated with processed encoded content segments.

14. The computer-implemented method of claim 13 further comprising providing the generated index to the identified egress node to identify a storage location for encoded content.

15. A computer-implemented method to manage transmission of content comprising:

identifying one or more ingress nodes from a set of available ingress nodes responsive to content transmitted by a content provider, wherein the identification is based on attributes of the content provider and a video packaging service, wherein the set of available ingress nodes processes encoded segments from received encoded content streams, stores the encoded segments, and updates an index identifying locations of the encoded segments;

identifying an egress node from a set of available egress nodes responsive to a set of requests for streaming content transmitted by a requesting entity, wherein the identification is based on attributes of the requesting entity and the video packaging service, wherein the set of available egress nodes identifies the locations of the encoded segments, packages encoded content to be provided based on the identified locations of the encoded segments, and transmits the packaged content responsive to content requests; and causing transmission of a set of encoded segments corresponding to the set of requests for streaming content by the identified egress node, wherein the set of encoded segments is identified from meta-data provided by the identified ingress nodes.

16. The computer-implemented method of claim 15, wherein identifying one or more ingress nodes from the set of available ingress nodes responsive to content transmitted by a content provider includes identifying a plurality of ingress nodes.

17. The computer-implemented method of claim 16 further comprising receiving a plurality of encoded content streams from the content provider, wherein individual content streams of the plurality of encoded content streams correspond to a set of encoded segments encoded according one or more encoding profiles.

18. The computer-implemented method of claim 17, wherein the one or more encoding profiles correspond to one of an encoding bitrate or format.

19. The computer-implemented method of claim 15, wherein the attributes of the content provider and the video packaging service and the attributes of the requesting entity and the video packaging service are different.

20. The computer-implemented method of claim 15, wherein the meta-data provide by the identified ingress nodes corresponds to encoded content index.

* * * * *